United States Patent
Alperovich et al.

(10) Patent No.: US 6,546,242 B1
(45) Date of Patent: Apr. 8, 2003

(54) SYSTEMS, METHODS AND APPARATUSES FOR MAINTAINING SERVICES WITHIN A TELECOMMUNICATIONS NETWORK HAVING SEPARATE SERVICE PROVIDERS AND NETWORK PROVIDERS

(75) Inventors: Vladimir Alperovich, Dallas, TX (US); Theodore Havinis, Plano, TX (US)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 0 days.

(21) Appl. No.: 09/522,959

(22) Filed: Mar. 10, 2000

(51) Int. Cl.[7] .................................................. H04M 3/00
(52) U.S. Cl. ..................... 455/418; 455/419; 455/414; 455/432
(58) Field of Search ................................. 455/432, 433, 455/456, 414, 412, 418, 419, 560, 420; 370/338; 379/111

(56) References Cited

U.S. PATENT DOCUMENTS

| | | | | |
|---|---|---|---|---|
| 5,572,579 A | * | 11/1996 | Orriss et al. ................. 379/111 |
| 5,915,220 A | * | 6/1999 | Chelliah ....................... 455/435 |
| 5,974,308 A | * | 10/1999 | Vedel ........................... 455/433 |
| 6,026,304 A | * | 2/2000 | Hilsenrath et al. ........... 455/456 |
| 6,035,189 A | * | 3/2000 | Ali-Vehmas et al. ........ 455/414 |
| 6,058,309 A | * | 5/2000 | Huang et al. ................ 455/433 |
| 6,067,456 A | * | 5/2000 | Duran .......................... 455/461 |
| 6,356,756 B1 | * | 3/2002 | Koster .......................... 455/414 |
| 6,414,950 B1 | * | 7/2002 | Rai et al. ..................... 370/338 |

* cited by examiner

Primary Examiner—Thanh Cong Le
Assistant Examiner—Lana Le
(74) Attorney, Agent, or Firm—Gardere Wynne Sewell LLP; Kenneth R. Glaser; Ronald W. Burns

(57) ABSTRACT

The present invention provides a computer program embodied on a computer readable medium. The computer may include a code segment for storing user service information. The computer program may also include a code segment for communicating with a mobile switching station and remote service providers. The computer program may further include a code segment for accessing services from remote service providers. The computer program may also include a code segment for routing the services to a communications device.

29 Claims, 2 Drawing Sheets

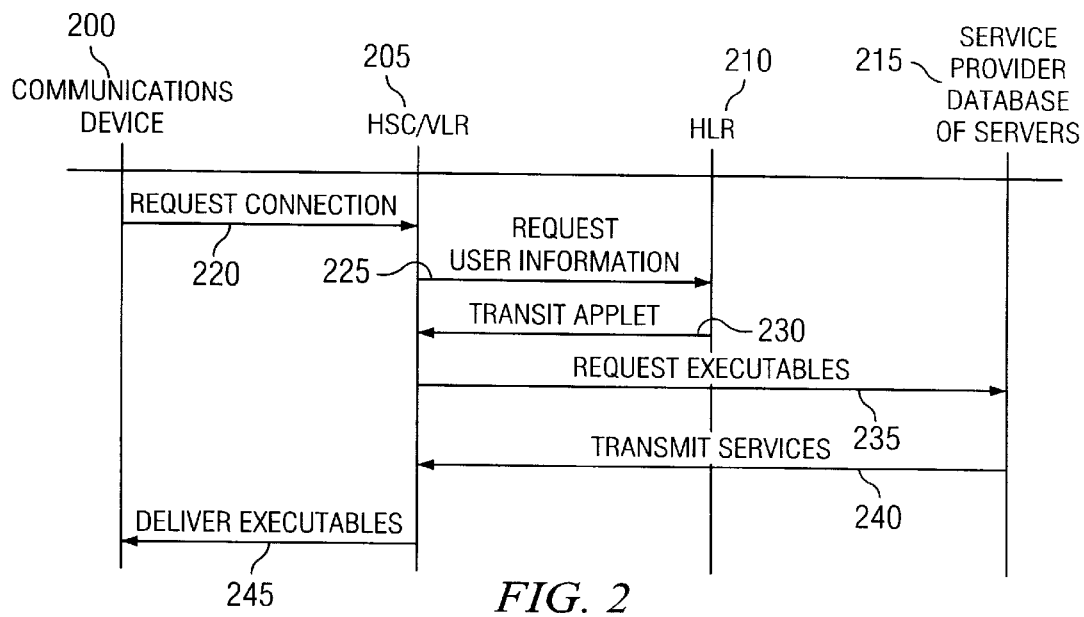
FIG. 2
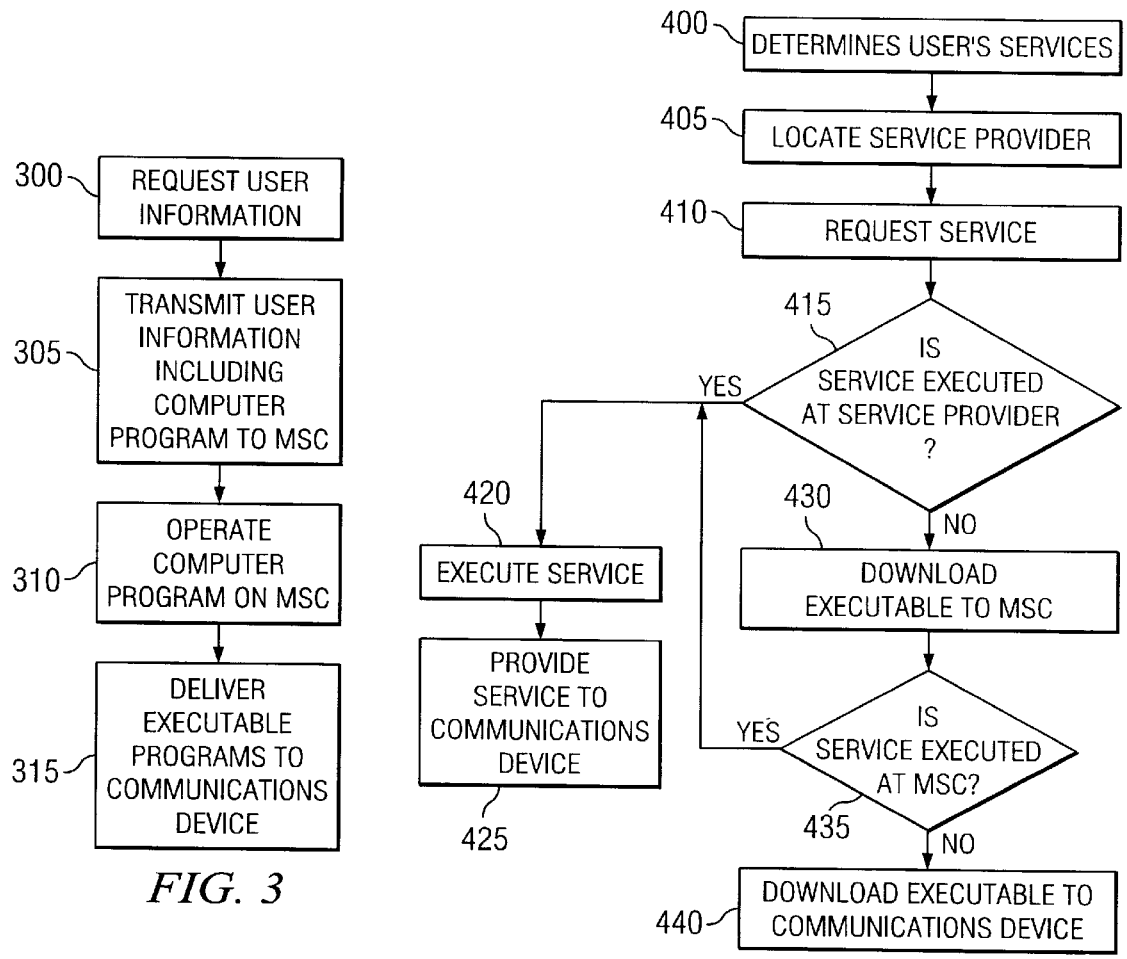
FIG. 3
FIG. 4

SYSTEMS, METHODS AND APPARATUSES FOR MAINTAINING SERVICES WITHIN A TELECOMMUNICATIONS NETWORK HAVING SEPARATE SERVICE PROVIDERS AND NETWORK PROVIDERS

TECHNICAL FIELD OF THE INVENTION

The present invention relates generally to the field of telecommunications and, more particularly, to systems methods, and apparatuses for maintaining services within a telecommunications network having separate service providers and network providers.

BACKGROUND OF THE INVENTION

Today all the subscribers are provided the same applications, if they have the same network provider. Usually the applications are coded in the switch itself so that the user of the network is limited to those services which the switch has available. It is anticipated that information retrieval, electronic commerce as well as the provisioning or management of services will increase in such a degree that the handling of signaling, data, call setup and routing of a call will become very complicated. A need for service mobility will become extremely important.

SUMMARY OF THE INVENTION

The present invention provides a computer program embodied on a computer readable medium. The computer may include a code segment for storing user service information. The computer program may also include a code segment for communicating with a mobile switching station and remote service providers. The computer program may further include a code segment for accessing services from remote service providers. The computer program may also include a code segment for routing the services to a communications device.

The present invention also provides a method of maintaining services within a telecommunications network having separate service providers and network providers. The method may include the steps transmitting a computer program to a mobile switching station with the computer program having user service information, executing the computer program at the mobile switching station, retrieving services from remote service providers based upon the user service information, and delivering the services to a communications device.

The present invention further provides a system for maintaining services within a telecommunications network having separate service providers and network providers. The system may include a database to store user information, a computer program resident in the database with the computer program containing user service information, and a mobile switching station in communication with the database.

BRIEF DESCRIPTION OF THE DRAWINGS

FIG. 2 is a signaling sequence diagram illustrating the signaling of the system of FIGS. 1A–1B;

FIG. 3 is a block diagram showing the operation of the system of FIGS. 1A–1B; and FIG. 4 is a block diagram showing the operation of the computer program of the present invention.

DETAILED DESCRIPTION

As used herein, the following terms shall have the following meanings:

"Services" mean voice mail, long distance service, call forwarding, pager service, and the like as used by persons operating communication devices;

"Service Provider" means an organization who provides the services;

"Network Provider" means an organization that provides its health communications system for persons using communication devices;

"HLR" means Home Location Register;

"MSC" means Mobile Switching Station; and

"VLR" means Visitor Location Register.

Figure 1A:
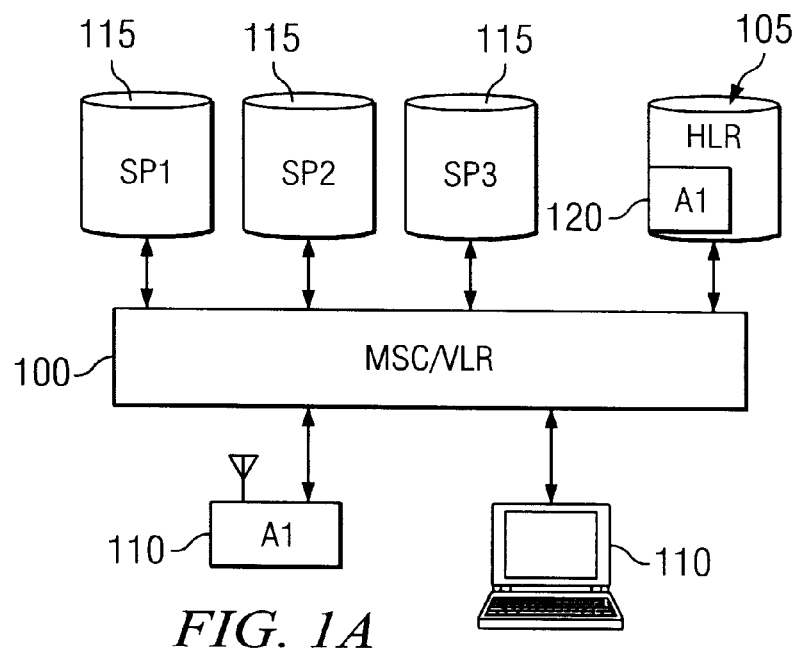
FIGS. 1A–1B are schematic diagram of the system of the present invention.

Referring now to FIG. 1A, a telecommunications network of the present invention is generally depicted. The telecommunications network comprises a MSC 100. The MSC 100 may be in communication with a HLR 105. It will be appreciated, however, that any database may be connected to and in communication with the MSC 100. One or more communication devices 110 may be in communication with the MSC 100. The communications devices 110 may be any standard type of device such as a mobile phone, a computer, a personal digital assistant, or the like. In addition, one or more service providers 115 may be in communication with the MSC 100.

The HLR 105 may contain subscriber information, such as supplementary services and authentication parameters. The HLR 105 may also contain information about the location of the communications device, for example, information about the MSC area in which the communications device is presently residing. As the communications device moves around, the information changes and the communications device can send the information, for example, location information, to the HLR, thus providing means to receive a call. Contained within the MSC 100, may be a VLR. The VLR may be a database containing information about all the communication devices currently located in the MSC area. As soon as a communications device roams into a new MSC area, the VLR connected to the new MSC will request data about the communications device from the HLR responsible for the communications device. The communications device will inform the HLR of the new MSC area in which it resides. By allowing the VLR/MSC in the new area to communicate with the HLR responsible for the communication devices, the VLR in the new MSC area will have the information necessary to assist the communications device in performing its functions.

Contained with the HLR of FIG. 1A, is a computer program 120. The computer program 120 can be designed specifically for a particular communication device user. It will be appreciated, however, that the computer program 120 can be a computer program with segments designated for each communication device contained within the HLR 105. The computer program 120 may contain user service information. The user service information provides the MSC 100, the location and provider of specified services, such as call forwarding, call waiting, and the like.

Figure 1B:
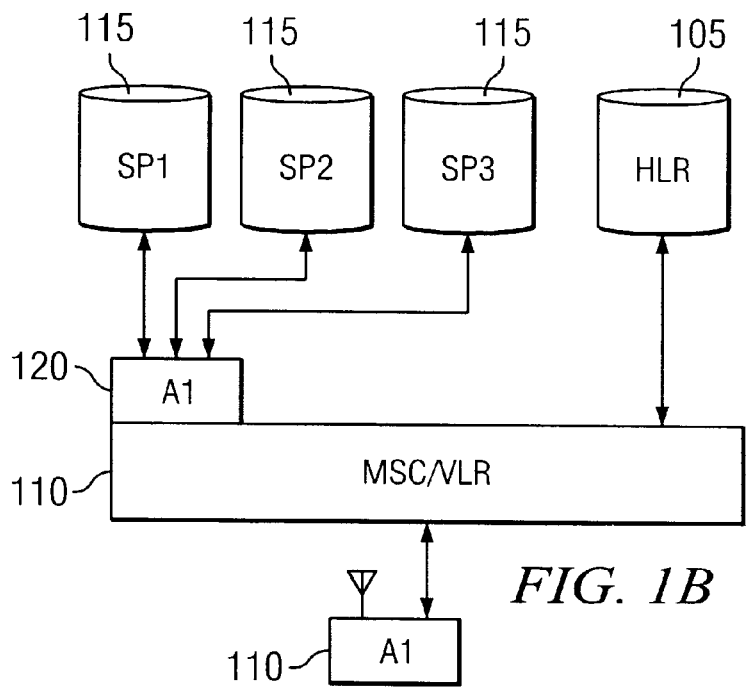

When the system of FIG. 1A is operational, the communications device 110 contacts the MSC 100 to begin operation, such as making a phone call. The MSC 100 requests user information about the communications device 110 from the HLR 105. The HLR 105 sends the user information to the MSC 100, which includes the computer program 120. As is shown in FIG. 1B, the computer program 120 resides on the MSC 100 during the operation of the communications device 110.

Referring now to FIG. 2, a signaling sequence diagram demonstrating the communications between the multiple devices in the system of the present invention is shown. The signaling sequence diagram includes a communications device 200, an MSC/VLR 205, an HLR 210, and a service provider 215. Initially, the communications device 200 may request to begin operation and thus the communications device sends a message to the MSC/VLR 205, as shown by 220. When the MSC/VLR 205 receives the message from the communications device 200, the MSC/VLR 205 requests user information from the HLR 210, as shown by 225. After the HLR 210 receives the request for user information 225 from the MSC/VLR 205, the HLR searches its database for the proper user and that user's information. The HLR 210 then transmits the user information to the MSC/VLR 205, as shown by 230.

Under the present invention, the information transmitted from the HLR 210 to the MSC/VLR 205 may contain the computer program 120. Once the MSC/VLR 205 receives the user information along with the computer program 120, the computer program 120 can be executed by the MSC/VLR. After the computer program 120 begins operation at the MSC/VLR 205, the MSC/VLR 205 requests the executable services from the service provider 215, as shown by 235. The service provider 215 then transmits or executes the services requested, as shown by 240. Once the MSC/VLR 205 receives the services from the service provider 215, the MSC/VLR 205 delivers the services to the communications device 200, as shown by 245.

Referring now to FIG. 3, a block diagram illustrating in more detail the operation of the computer program 120 is given. Once the computer program 120 has been transmitted from the HLR 105 to the MSC/VLR 100, the computer program 120 begins operation. The computer program may first determine the services which the user of the communications device requires, as shown by block 300. As indicated by block 305, after the services required are determined, the computer program 120 locates the service providers needed to perform the services. After locating the service providers, the computer program 120 requests the services from the service providers, as shown by block 310. Once the service providers receive the request for the services from the computer program, the service providers will then deliver the services to be transferred to the communications device, as shown by block 315.

FIG. 4 shows a block diagram further illustrating the delivery of services from the service provider to the communications device. As shown by block 400, the computer program 120 determines the user's services. Thereafter, the computer program 120 locates the service provider in block 405 and requests the services from the service provider in block 410. The service provider then determines if the service is to be executed at the server or database where the service is located, as shown by block 415. If the service is performed or executed at the server or database, then the service is performed in block 420 and transmitted to the communications device in block 425. If, however, the service is not executed at the database or server of the service provider, as determined in block 415, then the executable program to operate the service is transmitted to the MSC/VLR, as shown by block 430.

The MSC/VLR then determines if the service is to be executed at the MSC/VLR, as shown by block 435. If the service is to be executed at the MSC/VLR, then the service is performed in block 420 and the services are transmitted to the communications device, as shown by block 425. If, however, the service is not to be executed at the MSC/VLR, as determined in block 435, then the executable program for the service is transmitted to the communications device, as shown by block 440. Once the communications device receives the executable program, the communications device performs the service.

What is claimed is:

1. A computer program embodied on a computer readable medium comprising:
    a code segment for storing user service information specifying one or more services;
    a code segment for communicating with a mobile switching station and one or more remote service providers;
    a code segment for locating one of the remote service providers to perform each specified service;
    a code segment for accessing each specified service from the located remote service provider; and
    a code segment for routing the specified services to a communications device.

2. The computer program of claim 1 wherein the code segment for routing the specified services further includes a code segment for downloading the specified services from the remote service providers to the mobile switching station.

3. The computer program of claim 2 wherein the code segment for downloading the specified services further includes a code segment for executing the specified services at the mobile switching station.

4. The computer program of claim 2 wherein the code segment for downloading the specified services further includes a segment for transmitting the specified services to the communications device.

5. The computer program of claim 4 wherein the communications device executes the specified services.

6. The computer program of claim 1 wherein the communications device is a mobile phone.

7. The computer program of claim 1 wherein the communications device is a computer.

8. The computer program of claim 1 wherein the communications device is a personal digital assistant.

9. A method of maintaining one or more services to a communications device within a telecommunications network having separate service providers and network providers, the method comprising the steps of:
    transmitting user information associated with the communications device to a mobile switching station, the user information containing a computer program to provide the services to the communications device;
    executing the computer program at the mobile switching station, wherein the computer program, locates a service provider to perform each service and requests the one or more services from the located service providers;
    receiving the requested services from the located service providers; and
    delivering the requested services to the communications device.

10. The method of claim 9 wherein the communications device is a mobile phone.

11. The method of claim 9 wherein the communications device is a computer.

12. The method of claim 9 wherein the communications device is a personal digital assistant.

13. The system of claim 8 wherein the communications device is a mobile phone.

14. The system of claim 8 wherein the communications device is a computer.

15. The system of claim 8 wherein the communications device is a personal digital assistant.

16. The method as recited in claim 9 wherein the computer program further determines one or more services to be provided to the communication device.

17. The method as recited in claim 9 wherein the step of receiving the requested services from the located service providers comprises the steps of:

receiving one or more executables corresponding to the requested services from the located service providers; and executing the one or more executables to provide the requested services.

18. The method as recited in claim 9 wherein the steps of receiving the requested services from the located service providers and delivering the requested services to the communications device comprise the steps of:

receiving one or more executables corresponding to the requested services from the located service providers;

delivering the one or more executables to the communications device; and executing the one or more executables to provide the requested services.

19. The method as recited in claim 9 further comprising the step of determining whether one or more executables corresponding to the requested services are to be executed at the service provider, the mobile switching station or the communications device.

20. The method as recited in claim 9 wherein the requested services comprise one or more executables corresponding to the requested services.

21. A system for maintaining one or more services to a communications device within a telecommunications network having separate remote service providers and network providers comprising:

a database to store user information;

a mobile switching station in communication with the database; and a computer program resident in the database, the computer program comprising a code segment for storing user service information specifying the one or more services for the communications device, a code segment for communicating with the mobile switching station and the remote service providers, a code segment for locating one of the remote service providers to perform each specified service, a code segment for accessing each specified service from the located remote service provider, and a code segment for routing the specified services to the communications device.

22. The system of claim 21 wherein the database is a home location register.

23. The system of claim 21 wherein the one or more remote service providers are in communication with the mobile switching station.

24. The system of claim 21 wherein the communications device is in communication with the mobile switching station.

25. The system of claim 21 wherein the code segment for routing the specified services further includes a code segment for downloading the specified services from the remote service providers to the mobile switching station.

26. The system of claim 25 wherein the code segment for downloading the specified services further includes a code segment for transmitting the specified services to the communications device.

27. The system of claim 26 wherein the communications device executes the services.

28. The system of claim 21 wherein the code segment for downloading the specified services further includes a code segment for executing the specified services at the mobile switching station.

29. The system of claim 18 wherein the computer program is downloaded to the mobile switching station for execution.

* * * * *